May 2, 1950 C. H. COLLINS 2,506,012
FORMING TOOL
Filed April 15, 1946 4 Sheets-Sheet 1

INVENTOR
CHARLES H. COLLINS
BY
Toulmin & Toulmin
ATTORNEYS

May 2, 1950  C. H. COLLINS  2,506,012
FORMING TOOL
Filed April 15, 1946  4 Sheets-Sheet 2
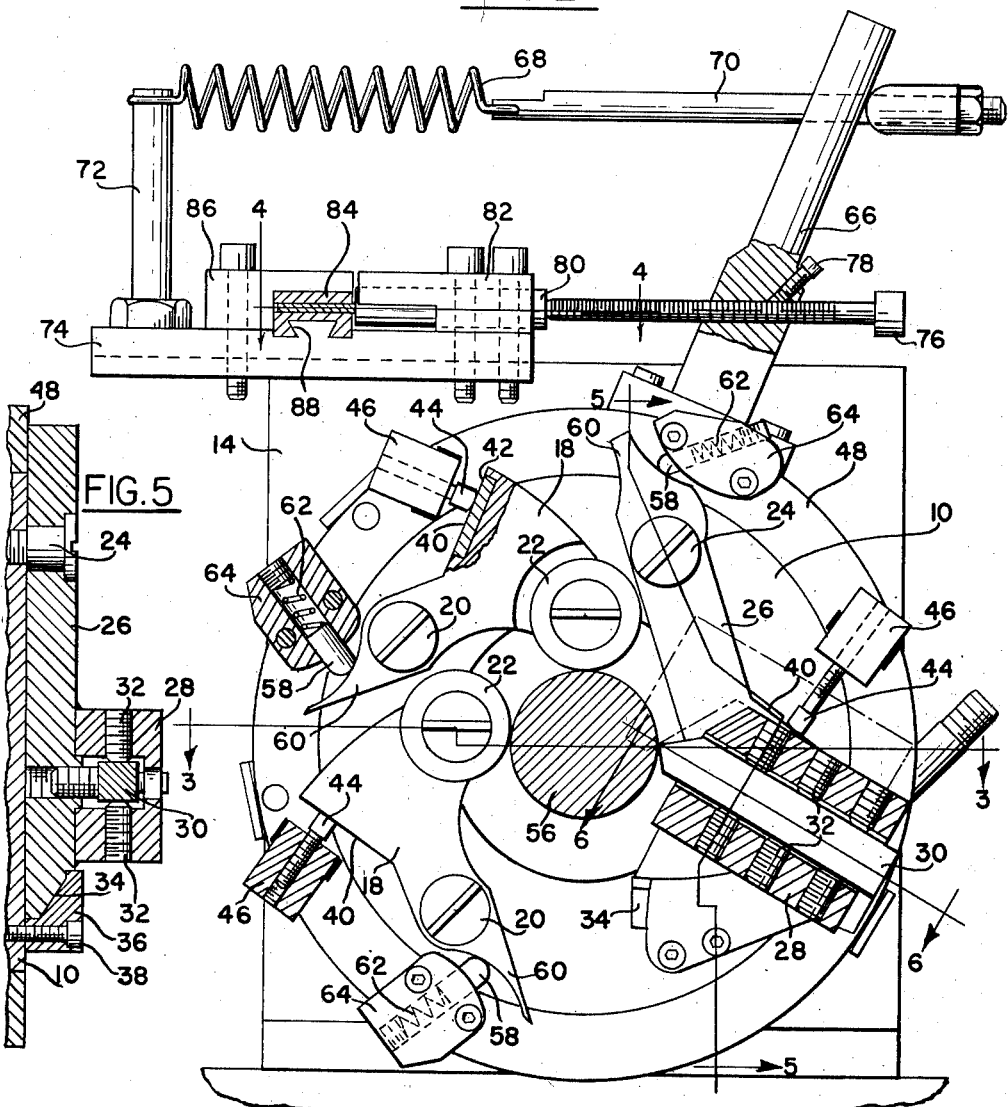
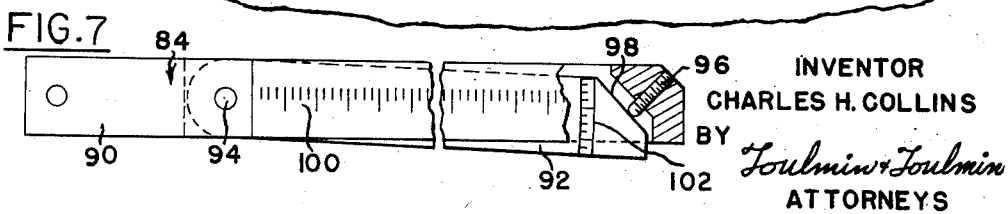
INVENTOR
CHARLES H. COLLINS
BY
*Toulmin & Toulmin*
ATTORNEYS May 2, 1950
C. H. COLLINS
2,506,012
FORMING TOOL
Filed April 15, 1946
4 Sheets-Sheet 3
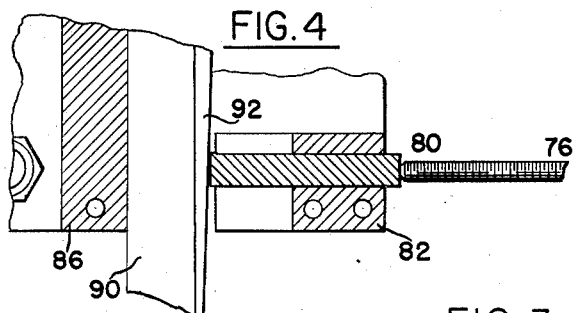
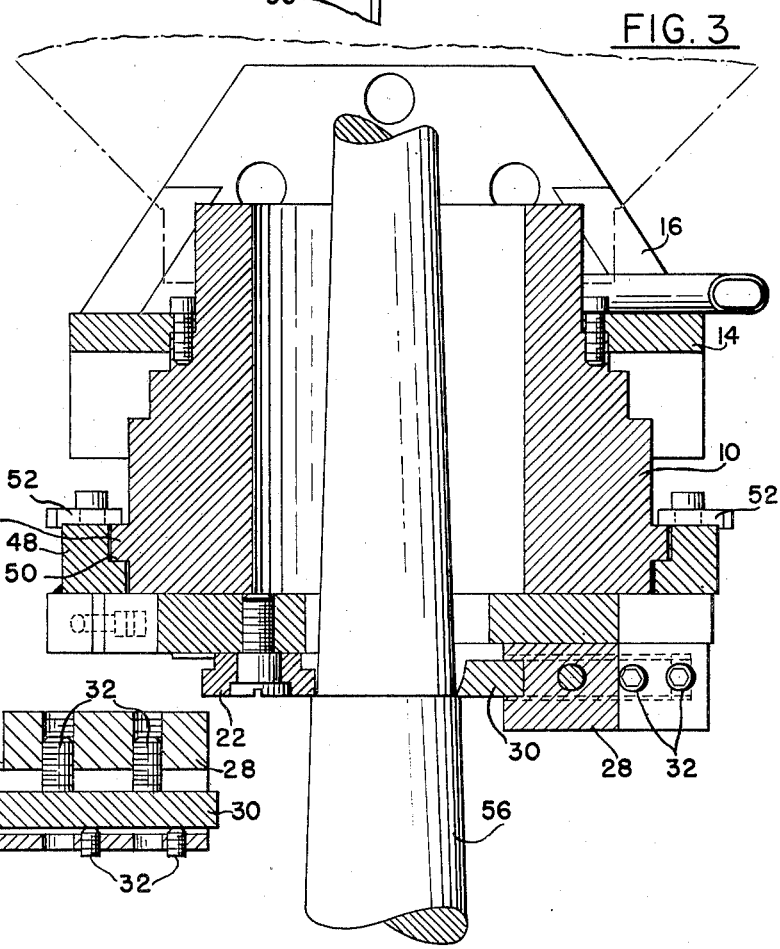
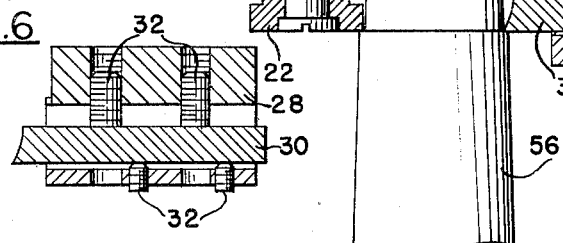
INVENTOR
CHARLES H. COLLINS
BY *Toulmin & Toulmin*
ATTORNEYS

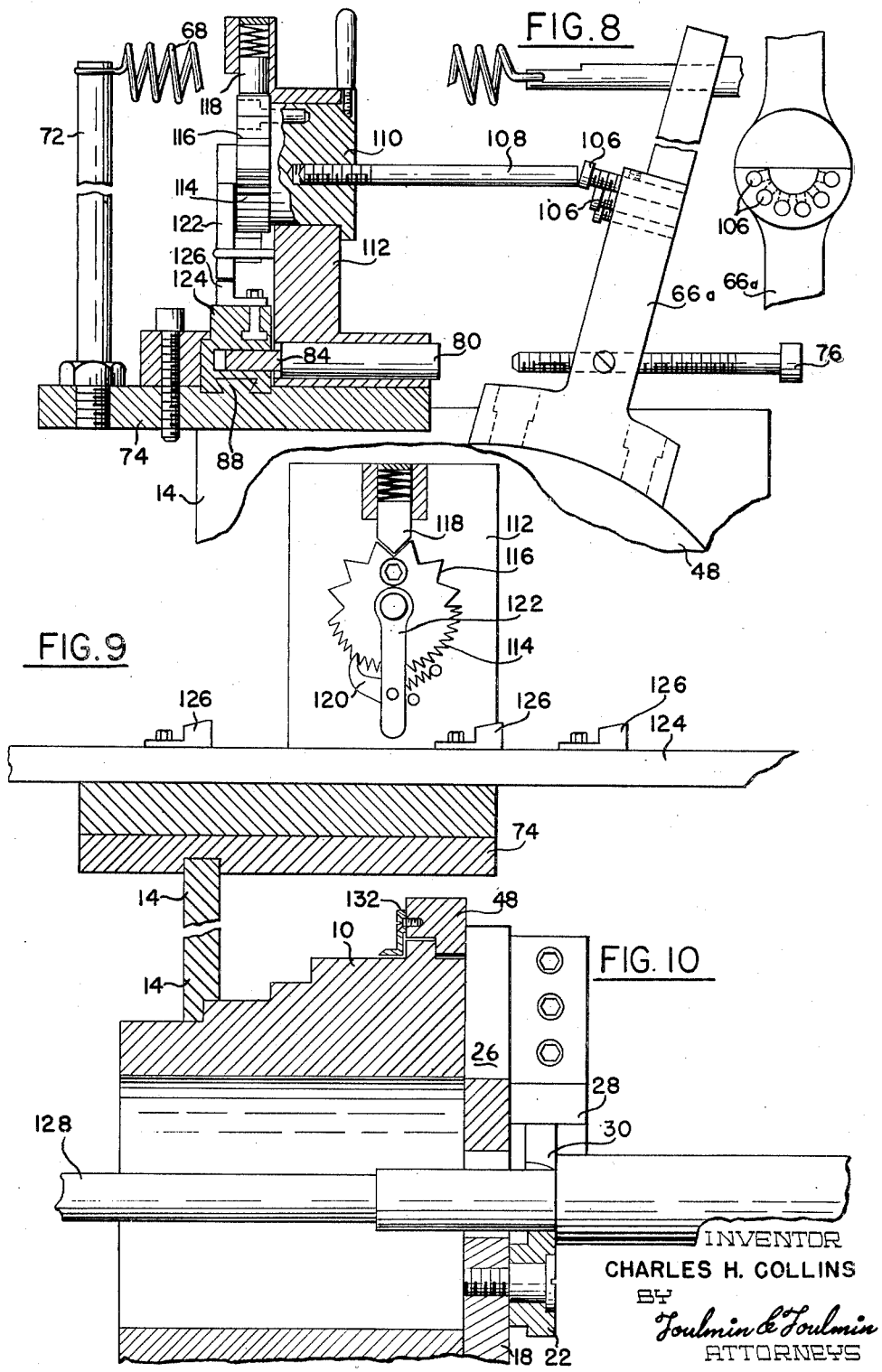

Patented May 2, 1950

2,506,012

UNITED STATES PATENT OFFICE 2,506,012

FORMING TOOL

Charles H. Collins, Miamisburg, Ohio

Application April 15, 1946, Serial No. 662,325

9 Claims. (Cl. 82—17)

This invention relates to tools and particularly to forming tools adapted for turning shaped workpieces.

The particular object of this invention is to provide an improved turning tool by means of which complex contours can readily be formed on workpieces in a lathe or similar turning machine.

Another object is to provide a contour turning tool having multiple adjustments in order to improve the character of the work produced thereby.

Still another object is to provide a contour turning tool in the form of a box tool which simultaneously supports and turns the work.

It is also an object of this invention to provide a turning tool which is selectively operable to turn tapers or to turn shouldered workpieces, the tapers or shoulders being automatically cut as the tool traverses the work.

It is still a further object of this invention to provide a contour turning tool which is self-contained and which may be mounted on the face of a turret in a turret lathe or secured to the carriage or cross-slide of a lathe.

These and other objects and advantages become more apparent upon reference to the following specification taken together with the accompanying drawings in which:

Figure 2 is a transverse sectional view indicated by the line 2—2 on Figure 1 and showing the turning tool of this invention;

Figure 3 is a plan section indicated by the line 3—3 on Figure 2;

Figure 4 is a plan section indicated by the line 4—4 on Figure 2;

Figure 5 is a partial vertical section indicated by the line 5—5 on Figure 2;

Figure 6 is a section through the tool bit and is indicated by the line 6—6 on Figure 2;

Figure 7 is a view showing one form of adjustable bar for actuating the cutting means and supporting rollers;

Figures 8 and 9 are views of a modified construction especially adapted for turning shouldered workpieces; and Figure 10 is a view showing a typical workpiece as machined by the modified tool arrangement shown in Figures 8 and 9.

General arrangement

Figure 1:
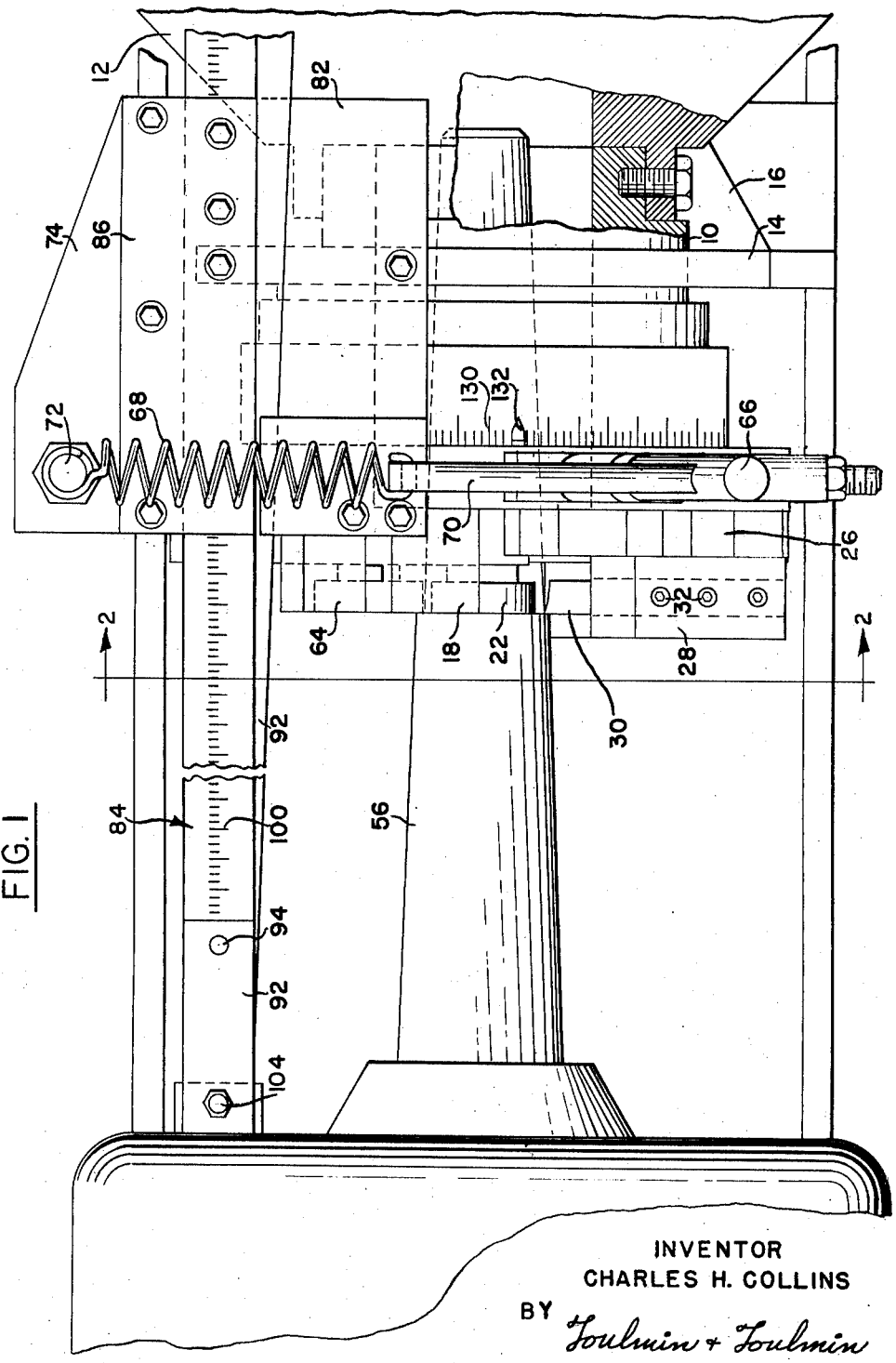
Figure 1 is a plan view showing a portion of a lathe or turning machine having a tool according to my invention mounted therein.

According to this invention, there is provided a frame having a passage therethrough adapted for receiving a workpiece. Rotatably mounted on the frame are a plurality of members comprising cutting means and rollers, the said rollers and cutting means boxing in the work as it is being turned.

The rollers and cutting means are adjusted about their pivots by abutments which are carried on a rotatable ring carried by the frame. The adjustment of the rollers and cutting means is equal and simultaneous so that the work is continuously supported by the said rollers.

Connected with the adjustable ring is an arm which is abutted by a plunger so that movement of the plunger will move the said arm and therethrough the adjusting ring to vary the positions of the rollers and cutting means.

A cam is located to ride against one end of the aforementioned plunger so that as the cutting tool is moved along the work the cam will actuate the plunger and adjust the cutting means relative to the work to generate any predetermined contour thereon. The aforementioned cam may consist of two straight bars pivoted at one end and angularly adjustable or may consist of one straight bar and one bar having a predetermined configuration for engaging the plunger.

A modified mechanism for moving the adjusting ring and arm consists of a plurality of stops and an indexing stop whereby the arm and ring are shifted quickly to adjust the cutting means radially of the workpiece thereby to form shoulders. By combining the adjustable bar mechanism with the indexing stop mechanism, a workpiece may be turned having both shoulders and tapered or contoured portions.

Structural arrangement

Referring to the drawings, the device of this invention consists of a hollow cylindrical frame member indicated at 10 in Figures 1, 2, and 3 which may be shaped at one side to be received into the face of a turret 12 of a lathe or other turning machine. Optionally, the frame 10 may be supported by a bracket 14 having a foot 16. This is best illustrated in Figure 3 wherein it will be seen that the foot 16 of the bracket 14 is adapted for being secured to a lathe carriage or cross-slide.

Carried on the face of the frame 10 opposite the turret 12 are a plurality of arms 18, pivoted to the said frame as by the shoulder screws 20 and having at their one ends the freely pivoted rollers 22. Also pivoted on the same face of the frame 10 as by the shoulder screw 24 is an arm 26 which carries at its end a tool block 28. Within the tool block 28 is a tool bit 30 that is adjustable in all directions within the said tool box by a plurality of set screws 32 which engage the tool bit from all sides thereof. These adjusting screws are best seen in Figures 2, 5 and 6 wherein it will be noted that there is clearance on all sides of the tool bit to permit its adjustment in all directions including angular adjustment in order precisely to locate the cutting edge of the tool relative to the workpiece.

The lower end of the arm 26 terminates in the wedge portion 34 formed on a radius swung from the center of the screw 24. The wedge 34 is closely received between the frame 10 and the face of a correspondingly shaped wedge member 36 which is secured to the face of the block 10 by screws 38.

Each of the arms 18 and 26 includes a surface 40 which may comprise a hardened wear-plate 42 mounted on the said arm as by brazing. The several surfaces 40 are abutted by the screws 44 each of which is adjustable in a block 46. The blocks 46 in turn are carried on a ring 48 which is shouldered as indicated at 50, Figure 3, and which is rotatable on the frame 10 while being retained in position thereon by a plurality of plates 52 fastened to the said ring and fitting behind the flange 54 on the frame 10. By rotating the ring 48 in a clockwise direction as viewed in Figure 2, the arms 18 and 26 are actuated in a clockwise direction to move the tool 30 and the rollers 22 toward the center of the workpiece 56 which is being turned. In Figure 3, it will be noted that the points of contact of the rollers 22 and the point of contact of the tool 30 are coplanar so that by simultaneously adjusting the rollers and tool the work is continuously supported. Referring again to Figure 2, it will be noted that the cutting edge of the tool 30 is the same distance from the center of the screw 24 about which it rotates as the point of contact between the rollers 22 and the workpiece 56 is from the centers of the screws 20. This provides for equal movement of the rollers and tool relative to the workpiece.

For returning the rollers and tool from the workpiece when the ring 48 is rotated counterclockwise there may be provided the plungers 58 which engage the overhanging portions 60 of the arms 18 and 26 and which are spring pressed toward the said portion by springs 62. The plunger 58 and springs 62 are preferably carried in boxes 64 secured to the ring 48. Optionally, by properly shaping the surfaces 40 and the projections 60, the spring pressed plungers 58 may be replaced by fixed abutments so that the motion of the work engaging members is positive in both directions.

Connected with the ring 48 is an arm 66 which is spring urged to shift the ring 48 counterclockwise by a spring 68 and an adjustable rod 70. The spring 68 is anchored on a stud 72 carried in a plate 74 that is secured to the bracket 14.

Passing through the arm 66 is an adjustable screw 76 which may be locked in any position of the adjustment by the set screw 78. The screw 76 extends through the arm 66 and is abutted by a freely reciprocable plunger 80 carried in a block 82 secured to the aforementioned plate 74.

The plunger 80 extends through the block 82 and abuts a bar 84 which is slidable on the plate 74 within a recess formed by the said plate and the retaining block 86. For guiding the bar 84, the plate 74 may comprise a dove-tail slide 88.

The bar 84 is best shown in Figure 7 wherein it will be seen to comprise a member 90 which is hollowed out to receive a bar 92 that is pivoted to the member 90 at 94. An adjustable screw 96 in the member 90 abuts an inclined surface 98 on the end of the bar 92 for adjusting the angularity of the said bars. Preferably, the member 90 has inscribed thereon a scale shown at 100 so that the amount of relative movement between the cutting tool and the bar can be observed. Also, the bar 92 has preferably inscribed thereon the graduations shown at 102 by means of which the angularity of the bars can be determined.

The manner of securing the bar 84 in the turning machine is shown in Figure 1 in which view it will be seen that the bar is secured to the headstock of the turning machine by a bolt or other suitable rigid means as at 104. Then, as the tool moves toward the headstock and the plunger 80 moves down the incline of the bar 92, the spring 68 rocks the arm 66 and turns the ring 48 to move the tool and rollers outwardly. If the bar 92 is straight this movement is continuous and a taper such as is indicated in the drawing is turned on the workpiece. If the bar 92 is not straight but has some predetermined contour thereon, then the shape of the workpiece will be in conformity with this contour.

A modified construction is illustrated in Figures 8 and 9, the modification residing in the manner of actuating the arm 66$^a$ attached to the ring 48. This modification shows means for turning shouldered workpieces and for accomplishing this result the arm 66$^a$ includes a plurality of adjustable stop screws 106 which are positioned to be selectively abutted by a stop pin 108. The pin 108 is mounted off center in a barrel 110 which is rotatable in a bracket 112 fixedly carried on the plate 74. The side of the barrel opposite the stop pin 108 has the ratchet teeth 114 thereon and the detent recesses 116. The spring pressed plunger 118 carried on the bracket 112 engages the recesses 116 and yieldingly retains the barrel 110 in the several positions wherein the stop pin 108 is aligned with the stop screws 106. The ratchet teeth 114 are engageable by the spring pressed pawl 120 carried on the arm 122 pivoted on the barrel 110. For actuating the arm 122 to index the barrel from position to position, there is provided a bar 124 which is mounted in the same manner as the bar 84 in Figure 1 or which may be secured to the said bar 84 and which carries a plurality of dogs 126. The dogs 126 selectively engage the arm 122 to oscillate it about its pivot and thus to actuate the barrel 110. A typical workpiece formed with shoulders is indicated at 128 in Figure 10. The shoulders to be turned may be of any size and may be spaced as closely as desired.

In using a tool according to the present invention, the original set-up, or repetitive operations may be facilitated by a scale 130 on the frame 10 which is read by means of a pointer 132. This enables the tool to be reset to exactly the same position each time or to be initially placed approximately in the correct position when making a new set up.

It will be understood that this invention is susceptible to modification in order to adopt it to different usages and conditions and, accordingly, it is desired to comprehend such modifications within this invention as may fall within the scope of the appended claims.

I claim:

1. In a box tool; a frame; an arm pivoted on said frame; means comprising a guiding surface on said frame and a correspondingly shaped surface on the free end of said arm for guiding the said arm in movements about its pivot; a member rotatably mounted on said frame and having rigid abutment means to engage said arm on one side of its pivot and yielding abutment means to engage said arm on the other side of the pivot; an adjustable cam bar adapted for reciprocation relative to said frame to actuate said rotatable member; and workpiece supporting rollers for engaging a workpiece opposite a tool carried in said arm for continuously supporting the workpiece while being turned by said tool.

2. In a turning tool; a frame having a workpiece receiving aperture; tool carrying and workpiece supporting arms pivotally carried on said frame and positioned to engage the periphery of a workpiece at spaced points; an actuating ring rotatable on said frame and having a pair of abutments for each arm, said abutments engaging each arm on opposite sides of its pivotal connection with said frame; yielding means continuously urging said actuating ring in one direction; and cam means movable relative to said frame for actuating the said ring in the opposite direction against the thrust of said yielding means.

3. A frame having a workpiece receiving aperture; a tool carrying arm and a plurality of workpiece supporting arms pivotally mounted on said frame; an actuating ring on said frame having spaced abutments in engagement with each of said arms on opposite sides of the pivotal connection thereof with said frame whereby said arms may be simultaneously actuated in equal movements to and from the axis of a workpiece; yielding means continuously urging said ring in a direction to withdraw said arms from the axis of a workpiece in said aperture; and cam means engaging said ring and responsive to relative movement between said frame and cam means for actuating said ring in a direction to move said arms toward the axis of a workpiece in said aperture.

4. In a turning tool; a frame having an aperture for receiving a workpiece; a cutting tool supporting arm pivoted to said frame; steadyrest roller supporting arms pivoted to said frame, the tool and rollers on said arms engaging a workpiece at points spaced around the periphery thereof; an actuating ring rotatable on said frame; means connecting said ring with said arms comprising an adjustable abutment between each arm and said ring and resilient means maintaining said arms in firm contact with their respective abutments; yielding means continuously urging said ring in one direction; a cam bar; an adjustable abutment between said cam bar and said ring; and means guiding said cam bar in reciprocation relative to said frame thereby to actuate said ring.

5. The combination in a turning tool of a frame; arms spaced around said frame and pivotally supported thereon for engaging a workpiece at spaced points in supporting and cutting relationship; an actuating ring rotatably carried by said frame and engaging each of said arms on opposite sides of the pivotal supports thereof; and means for actuating said ring in opposite directions of rotative movement for actuating said arms in movements toward and away from said work axis.

6. In a turning tool; a frame having mounting means whereby the said tool may be mounted on a lathe carriage or on the face of a lathe turret; a plurality of arms pivoted on said frame and one comprising means for supporting a cutting tool and the others having workpiece supporting rollers thereon; a member rotatably carried on said frame to actuate said arms simultaneously and in equal movements toward and away from a workpiece being operated; yielding means continuously urging said member in one direction and an adjustable sine bar reciprocable relative to said frame for actuating said member in the opposite direction; and guiding means for the arm supporting the cutting tool comprising an arcuate end on the said arm adjacent the tool and an arcuate guideway on said frame engaging said arcuate end.

7. In a box tool; a frame; a plurality of arms pivoted on said frame and one thereof comprising tool supporting means and the others thereof having mounted thereon workpiece supporting rollers; guiding means on said frame for supporting the free end of at least the one of said arms having the tool supporting means; an actuating ring rotatably mounted on said frame and having abutment means to engage each of said arms on one side of its pivotal support on said frame; resilient abutment means to engage the said arms on the other side of their pivotal support on said frame; and means reciprocable relative to said frame for actuating said ring in rotary movements on said frame thereby to actuate said arms in unison toward and away from the axis of a workpiece extending therebetween.

8. In a box tool; a frame; a plurality of arms pivoted on said frame and one thereof comprising tool supporting means and the others thereof having mounted thereon workpiece supporting rollers; guiding means on said frame for supporting the free end of at least the one of said arms having the tool supporting means; an actuating ring rotatably mounted on said frame and having abutment means to engage each of said arms on one side of its pivotal support on said frame; resilient abutment means to engage the said arms on the other side of their pivotal support on said frame; and means reciprocable relative to said frame for actuating said ring in rotary movements on said frame thereby to actuate said arms in unison toward and away from the axis of a workpiece extending therebetween, said last mentioned means including mechanism for bringing about the movement of said ring in steps.

9. In a box tool; a frame; a plurality of arms pivoted on said frame and one thereof comprising tool supporting means and the others thereof having mounted thereon workpiece supporting rollers; guiding means on said frame for supporting the free end of at least the one of said arms having the tool supporting means; an actuating ring rotatably mounted on said frame and having abutment means to engage each of said arms on one side of its pivotal support on said frame; resilient abutment means to engage the said arms on the other side of their pivotal support on said frame; and means reciprocable relative to said frame for actuating said ring in rotary movements on said frame thereby to actuate said arms in unison toward and away from the axis of a workpiece extending therebetween, said means including a plurality of abutments each effective for positioning said ring in a different angular position, and being adapted for becoming successively effective during the relative reciprocation of said frame and the said means reciprocable relative thereto.

CHARLES H. COLLINS.

REFERENCES CITED

The following references are of record in the file of this patent:

UNITED STATES PATENTS

| Number | Name | Date |
|---|---|---|
| 1,168,326 | Nordstrom | Jan. 18, 1916 |
| 1,195,293 | Townsend | Aug. 22, 1916 |
| 1,646,758 | Matthews | Oct. 25, 1927 |
| 1,680,074 | Van Hamersveld | Aug. 7, 1928 |
| 1,795,594 | Class | Mar. 10, 1931 |
| 2,390,312 | Livingstone | Dec. 4, 1945 |

FOREIGN PATENTS

| Number | Country | Date |
|---|---|---|
| 486,829 | France | May 14, 1918 |